US010003669B2

(12) United States Patent
Hinrichs

(10) Patent No.: US 10,003,669 B2
(45) Date of Patent: Jun. 19, 2018

(54) METHODS AND APPARATUS TO CREATE AND TRANSMIT A CONDENSED LOGGING DATA FILE

(71) Applicant: ECHOSTAR TECHNOLOGIES L.L.C., Englewood, CO (US)

(72) Inventor: Joel Hinrichs, Centennial, CO (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 128 days.

(21) Appl. No.: 14/811,658

(22) Filed: Jul. 28, 2015

(65) Prior Publication Data
US 2017/0034303 A1    Feb. 2, 2017

(51) Int. Cl.
| H04L 29/08 | (2006.01) |
| H04L 12/26 | (2006.01) |
| H04N 21/45 | (2011.01) |
| H04N 21/4425 | (2011.01) |
| H04N 21/262 | (2011.01) |
| H04N 21/442 | (2011.01) |
| H04N 21/458 | (2011.01) |

(52) U.S. Cl.
CPC .............. *H04L 67/34* (2013.01); *H04L 43/02* (2013.01); *H04N 21/26291* (2013.01); *H04N 21/4424* (2013.01); *H04N 21/4425* (2013.01); *H04N 21/4516* (2013.01); *H04N 21/4586* (2013.01)

(58) Field of Classification Search
CPC ....................................................... H04L 67/34
See application file for complete search history.

(56) References Cited

U.S. PATENT DOCUMENTS

| 5,548,338 A * | 8/1996 | Ellis | H03M 7/42 348/467 |
| 5,757,669 A * | 5/1998 | Christie | G06Q 10/10 709/205 |
| 6,067,639 A * | 5/2000 | Rodrigues | G06F 11/3688 714/38.11 |
| 6,173,292 B1 * | 1/2001 | Barber | G06F 11/1471 707/682 |
| 6,233,674 B1 * | 5/2001 | Elnozahy | G06F 8/4434 712/209 |
| 6,466,971 B1 * | 10/2002 | Humpleman | H04L 12/2803 709/203 |
| 6,909,384 B2 * | 6/2005 | Baldwin | G06F 17/30985 341/55 |

(Continued)

OTHER PUBLICATIONS

ATSC, Advanced Television Systems Committee, "ATSC Standard: Program and System Information Protocol for Terrestrial Broadcast and Cable", 2013.*

(Continued)

*Primary Examiner* — O. C. Vostal
(74) *Attorney, Agent, or Firm* — Lorenz & Kopf LLP

(57) ABSTRACT

A method for producing log data for a programming receiver is provided. The method executes a set of instructions comprising at least a log statement, the log statement causing the programming receiver to access condensed source code; compresses one or more string arguments in the log statement, during execution of the set of instructions; and generates a log file, based on the executed set of instructions and the compressed one or more string arguments.

19 Claims, 7 Drawing Sheets

(56) References Cited

U.S. PATENT DOCUMENTS

| | | | | |
|---|---|---|---|---|
| 6,990,677 B1* | 1/2006 | Pietraszak | H04N 5/44543 | 348/E5.105 |
| 7,146,627 B1* | 12/2006 | Ismail | H04H 60/06 | 348/E7.061 |
| 7,298,960 B1* | 11/2007 | Taylor | G11B 27/034 | 348/E5.007 |
| 7,861,269 B1* | 12/2010 | Mohr | H04N 5/44543 | 725/39 |
| 8,589,403 B2* | 11/2013 | Marquardt | G06F 17/30144 | 706/25 |
| 2002/0049978 A1* | 4/2002 | Rodriguez | G06F 3/0486 | 725/86 |
| 2002/0091517 A1* | 7/2002 | Frank | G10L 21/028 | 704/231 |
| 2003/0110503 A1* | 6/2003 | Perkes | H04N 7/17318 | 725/86 |
| 2003/0141993 A1* | 7/2003 | Baldwin | G06F 17/30985 | 341/50 |
| 2003/0145327 A1* | 7/2003 | Baldwin | H04N 7/165 | 725/49 |
| 2003/0177503 A1* | 9/2003 | Sull | G06F 17/30796 | 725/112 |
| 2003/0195923 A1* | 10/2003 | Bloch | G06F 9/4443 | 709/203 |
| 2003/0221198 A1* | 11/2003 | Sloo | G06F 17/30796 | 725/136 |
| 2004/0049598 A1* | 3/2004 | Tucker | G06F 17/30899 | 709/246 |
| 2004/0194141 A1* | 9/2004 | Sanders | G06F 17/30817 | 725/53 |
| 2005/0203927 A1* | 9/2005 | Sull | G06F 17/30858 | |
| 2006/0053380 A1* | 3/2006 | Spataro | G06Q 10/10 | 715/753 |
| 2006/0059458 A1* | 3/2006 | Plummer | G06F 8/36 | 717/108 |
| 2006/0064716 A1* | 3/2006 | Sull | G06F 17/30793 | 725/37 |
| 2006/0125963 A1* | 6/2006 | Baek | H04N 5/45 | 348/631 |
| 2006/0155850 A1* | 7/2006 | Ma | H04L 29/06027 | 709/226 |
| 2006/0271971 A1* | 11/2006 | Drazin | H04N 7/17318 | 725/86 |
| 2006/0282419 A1* | 12/2006 | Sen | G06F 11/3636 | |
| 2007/0016672 A1* | 1/2007 | Wilson | G06F 9/542 | 709/224 |
| 2008/0124050 A1* | 5/2008 | Deschamp | G11B 27/034 | 386/241 |
| 2008/0244681 A1* | 10/2008 | Gossweiler | H04N 21/235 | 725/133 |
| 2008/0288460 A1* | 11/2008 | Poniatowski | G06F 17/30646 | |
| 2009/0199237 A1* | 8/2009 | White | H04N 5/782 | 725/39 |
| 2010/0205588 A1* | 8/2010 | Yu | G06F 8/456 | 717/149 |
| 2010/0228703 A1* | 9/2010 | Schneider | H03M 7/30 | 707/693 |
| 2011/0032333 A1* | 2/2011 | Neuman | H04N 13/0029 | 348/43 |
| 2011/0141347 A1* | 6/2011 | Suh | H04H 20/40 | 348/426.1 |
| 2011/0225417 A1* | 9/2011 | Maharajh | G06F 21/10 | 713/150 |
| 2011/0283021 A1* | 11/2011 | Koifman | G06F 3/0623 | 709/247 |
| 2011/0295819 A1* | 12/2011 | Amit | G06F 3/0608 | 707/693 |
| 2011/0311205 A1* | 12/2011 | McClanahan | H04N 5/782 | 386/296 |
| 2012/0224834 A1* | 9/2012 | Chen | H04N 5/765 | 386/293 |
| 2013/0219435 A1* | 8/2013 | Pattison | H04N 21/4383 | 725/68 |
| 2013/0332830 A1* | 12/2013 | Ciurdar | G06F 17/30 | 715/719 |
| 2014/0082672 A1* | 3/2014 | Casey | H04N 21/26283 | 725/50 |
| 2014/0282699 A1* | 9/2014 | Fertig | H04N 21/231 | 725/32 |
| 2015/0074718 A1* | 3/2015 | Moguillansky | H04N 21/482 | 725/40 |
| 2015/0104148 A1* | 4/2015 | Jayamanne | G11B 27/11 | 386/241 |
| 2015/0127670 A1* | 5/2015 | Torman | G06F 17/30345 | 707/755 |
| 2015/0213484 A1* | 7/2015 | Amara | G06Q 30/0246 | 705/14.45 |
| 2016/0041976 A1* | 2/2016 | Pradeep | G06F 17/30368 | 707/695 |
| 2016/0099359 A1* | 4/2016 | Goris | H01L 31/022441 | 136/249 |
| 2016/0156962 A1* | 6/2016 | Wei | H04N 21/4383 | 725/54 |
| 2016/0156988 A1* | 6/2016 | Tam | H04L 51/046 | 725/35 |
| 2016/0292395 A1* | 10/2016 | Pintaux | G06F 21/10 | |

OTHER PUBLICATIONS

Cabral et al., "RAIL: Code Instrumentation for .NET", 2005.*
Grob et al., "Controlling Open Source Intermediaries—A Web Log Mining Approach", 2004.*

* cited by examiner

METHODS AND APPARATUS TO CREATE AND TRANSMIT A CONDENSED LOGGING DATA FILE

TECHNICAL FIELD

Embodiments of the subject matter described herein relate generally to creating a logging data file. More particularly, embodiments of the subject matter relate to using encryption and compression techniques to generate a condensed logging data file.

BACKGROUND

Most television viewers now receive video signals through a content aggregator such as a cable or satellite television provider, or internet-based programming provider. Digital video broadcasting (DVB) systems, such as satellite systems, are generally known. A DVB system that delivers video service to a home will usually include a video services receiver, system, or device, such as a set-top box (STB), smart-TV, or streaming media receiver compatible with a television connection (such as a USB "stick"). These types of programming receivers may receive network television broadcasts, cable and/or satellite television broadcasts, on-demand programming, internet-based programming accessible via specialized software applications, or the like. In a typical instance, encoded audio/video signals are sent via cable, wireless data link, or other internet-based communication technique, where the signals are decoded by the appropriate video services receiver. The decoded signals can then be viewed on a television or other appropriate display as desired by the viewer.

A programming receiver reports "logging data", or information detailing its operations, on a regular basis. Logging data may indicate whether software executed without error, what errors occurred during a specified time period, and details regarding a particular error. Collecting and transmitting logging data is a peripheral operation, which is performed concurrently with normal operations of a programming receiver, and may occupy resources that would otherwise be directed to more efficient and timely performance of normal operations. Additionally, each log file (consisting of logging data) may occupy a significant amount of storage space and include a large amount of data for transmission for reporting purposes.

Accordingly, it is desirable to provide logging data in a way that allows for minimal disruption of normal operations of the programming receiver and/or requires the allocation of fewer storage resources. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for producing log data for a programming receiver. The method executes a set of instructions comprising at least a log statement, the log statement causing the programming receiver to access condensed source code; compresses one or more string arguments in the log statement, during execution of the set of instructions; and generates a log file, based on the executed set of instructions and the compressed one or more string arguments.

Some embodiments provide a programming receiver. The programming receiver includes: system memory; a communication device, configured to transmit a log file; and at least one processor, communicatively coupled to the system memory and the communication device, the at least one processor configured to: use an encryption technique at run time to compress a set of strings defined at run time to produce compressed values; and execute a log statement to generate the log file, using a pre-processed set of source code and the compressed set of strings defined at run time.

Some embodiments provide a method for generating a log file for a programming receiver. During run time of an object of a condensed set of source code by the programming receiver, the method: compresses arguments defined at run time to produce compressed values by the programming receiver; executes a log statement using the index values and the compressed values, by the programming receiver, the log statement invoking the condensed set of source code during execution; and generates the log file based on data produced during execution of the log statement by the programming receiver. This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
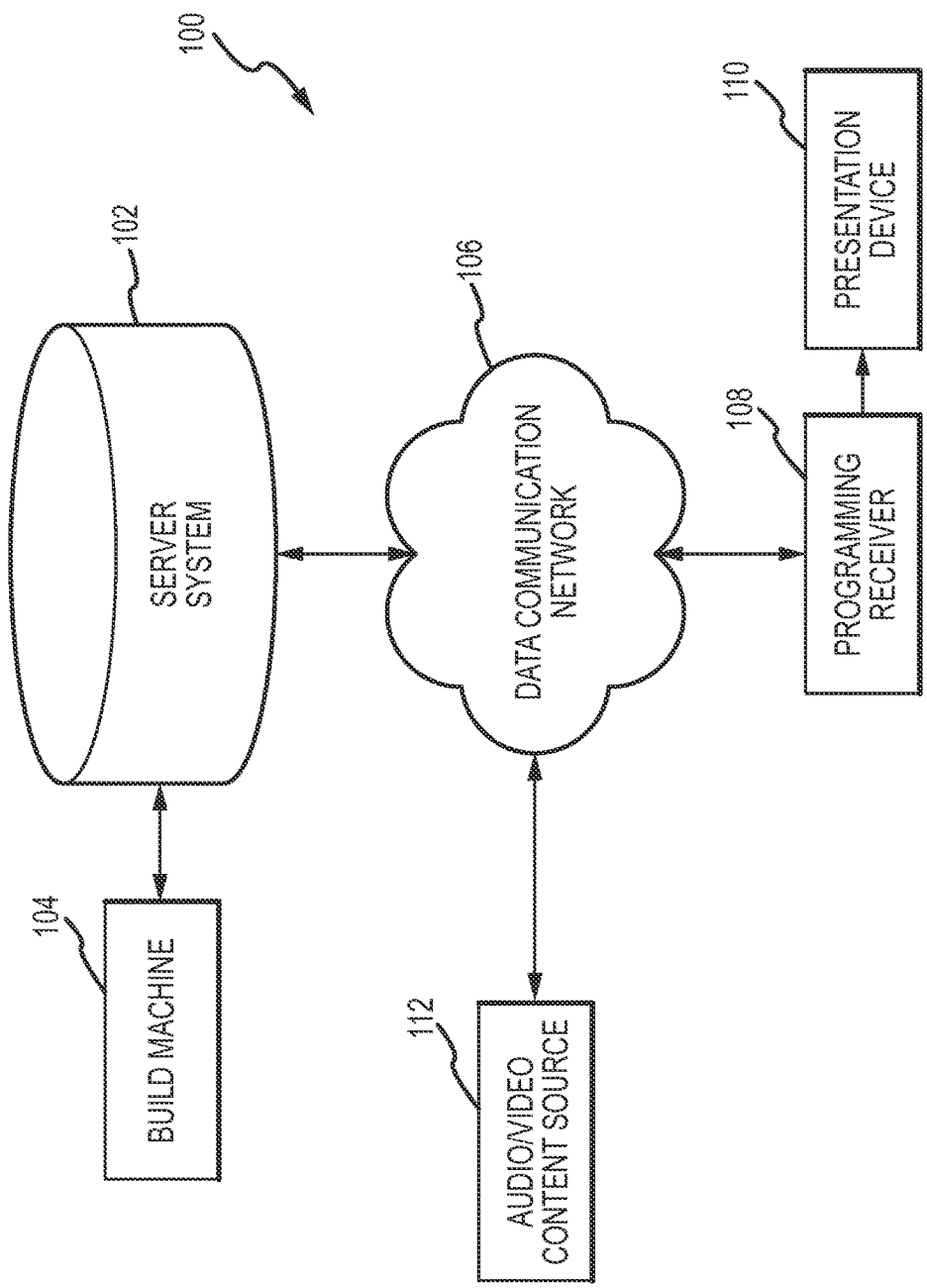
FIG. 1 is a schematic representation of an embodiment of a logging data collection system, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In the context of the present disclosure, certain terminologies are used with regard to the various embodiments of this disclosure. In the context of the present disclosure:

A log file is a periodically produced aggregation of logging data. Each log file may be transmitted, on demand from the central site, back to a central log file recording and analysis function. Log files are created by remote systems, and describe system events in sufficient detail to distinguish between desired and undesired processing outcomes, and to provide some insight into said undesired outcomes. Log analysis time occurs on a central site which is, or which is closely connected to, a logging data collection system. Log analysis includes the retrieval, storage, interpretation and analysis of log files. Logging data is the information generated at run time by the execution of log statements, and indicates errors and/or failure conditions occurring at the remote system (a.k.a. programming receiver) during normal operations. A log statement is a source code statement which, when compiled at build time and executed at run time, results in a log statement being added to the log file. Build time refers to the activity on a central system to convert source code into machine code, and then package machine code into a system program download file. Run time is the time at which machine code operates on a remote system.

In certain embodiments, a remote system executes logging functions whenever it is active, which is to say continually. In prior art embodiments which are well-known to a person of ordinary skill in the art, remote systems employ logging functions which generate human readable log data, using a print format string plus print arguments which correspond to the print specifiers present in the format string.

The present innovation consists of three interdependent changes. First, at build time, special processing has been added to the central site's compilation facility, and this processing modifies each source code file image during the time it is handled by the automated compiling procedure (compilation is the process of reading source code, analyzing it, and generating machine code which executes in the exact manner described by the source code). The special code detects log statements and the strings contained therein, including a source file name string, at least one format string, and such format arguments as may be required by print specifiers in the print format string. The special code also saves the strings in a dictionary which it creates for this purpose. Further, the special code deletes the saved strings from the source code image and replaces each saved string with its index or, in the case of the source file name string, with its file name hash. A file name hash is the numeric result of a mathematical operation which reduces a potentially very lengthy string representing the name of a unique software source file to a single conveniently sized numeric value which is also unique.

Second, at run time, instead of using the print format string the logging facility uses a numeric value which encodes which, if any, format codes appear in the format string, and appends as needed the fixed string IDs, run time numeric values, and a compressed format of strings which have been constructed at run time.

Third, at log analysis time, the central site retrieves log files from one or more remote systems. Each log file indicates which system build operation produced both the system program download file and the dictionary that was created along with that download file. Log analysis uses the dictionary to reconstitute the format and other fixed strings as they would have existed at run time, and as needed uncompresses any string or strings generated at run time.

Further, log analysis uses these strings to generate and store the exact human readable log data which would have been produced without the current innovation.

Turning now to the figures, FIG. 1 is a schematic representation of an exemplary embodiment of a logging data collection system 100, in accordance with the disclosed embodiments. The logging data collection system 100 operates to generate (via a remote system) logging data, and to obtain (at a centralized server system) the logging data generated by the remote system. One centralized server system generally communicates with a plurality of remote systems. Generally, remote systems have a particular, dedicated purpose; here, a remote system is implemented using a programming receiver 108 that is part of an audio/video content provider system.

Further, this innovation is intended to cover any remotely placed computing element (i.e., remote system) which generates human readable files, e.g. using ASCII, 16-bit extended character encoding, or any similar character-by-character encoding of human-readable information if, by converting from a commonly used text generation tool such as one of the "printf" routines which are common in the art, to a file containing the argument values that the tool converts to human-readable text, it realizes reduced computation and storage overheads in the remotely placed computing element and in the burden of transferring such files to any more centralized location. Embodiments of a remote system (e.g., programming receiver) may include, without limitation: retail sales terminals, systems in automobiles, digital video recorder (DVR) devices, unattended nodes in a communications environment (e.g., Ethernet routers, distributed computational webs, distributed content delivery webs, cloud servers, or the like.

As shown in this particular embodiment, the logging data collection system 100 includes a central server system 102 and build machine 104 in communication with a programming receiver 108. Here, the programming receiver 108 is used cooperatively with a presentation device 110 to provide a user with a display of audio/video content. The audio/video content is communicated from an audio/video content source 112 to a plurality of programming receivers 108 via the data communication network 106, fiber, internet, wireless, or cellular networks, and/or off-air, satellite, or cable broadcasts. The programming receiver 108 may be configured to record received video broadcast content, and may comprise Digital Video Recorder (DVR) technology.

Each programming receiver 108 may include or cooperate with a suitably configured presentation device 110, and each programming receiver 108 produces output that is communicated to a presentation device 110. The presentation device 110 may be implemented as, without limitation: a television set; a monitor; a computer display; a portable electronic device; or any suitable customer appliance with compatible display capabilities. In various embodiments, each programming receiver 108 is a conventional set-top box commonly used with satellite or cable television distribution systems. In other embodiments, however, the functionality of a programming receiver 108 may be commonly housed within a presentation device 110. In still other embodiments, a programming receiver 108 is a portable device that may be transportable with or without the presentation device 110. A programming receiver 108 may also be suitably configured to support broadcast television reception, video game playing, personal video recording and/or other features as desired.

During typical operation, the programming receiver 108 receives audio/video content, signaling information, and/or other data via the data communication network 106, fiber, internet, wireless, or cellular networks, and/or off-air, satellite, or cable broadcasts. The programming receiver 108 then demodulates, descrambles, decompresses, and/or otherwise processes the received digital data, and then converts the received data to suitably formatted video signals that can be rendered for viewing, and/or stored for future viewing, by the customer on the presentation device 110. The programming receiver 108 is further configured to generate and maintain logging information, which is a report produced at intervals which describes errors and/or failure conditions that have occurred at the programming receiver 108 during normal operations.

The programming receiver 108 is capable of communicating with a centralized server system 102 via a data communication network 106. The programming receiver 108 and the central server system 102 are generally disparately located. The programming receiver 108 is configured to provide a stream of activity reports to the central server system 102, which may include logging data, to facilitate diagnosing programming receiver operational problems. Activity reports may be provided by the programming receiver 108 at timed intervals, or in response to a query from the server system 102.

The data communication network 106 may be any digital or other communications network capable of transmitting messages or data between devices, systems, or components. In certain embodiments, the data communication network 106 includes a packet switched network that facilitates packet-based data communication, addressing, and data routing. The packet switched network could be, for example, a wide area network, the Internet, or the like. In various embodiments, the data communication network 106 includes any number of public or private data connections, links or network connections supporting any number of communications protocols. The data communication network 106 may include the Internet, for example, or any other network based upon TCP/IP or other conventional protocols. In various embodiments, the data communication network 106 could also incorporate a wireless and/or wired telephone network, such as a cellular communications network for communicating with mobile phones, personal digital assistants, and/or the like. The data communication network 106 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The central server system 102 stores and uses source code to generate object code used by the programming receiver 108 in generating log files. Source code is a primary set of executable instructions expressed in a human-readable format. Source code is created, updated, modified, and maintained by software professionals. The central server system 102 may include any number of application servers, and each server may be implemented using any suitable computer. In some embodiments, the central server system 102 includes one or more dedicated computers. In some embodiments, the central server system 102 includes one or more computers carrying out other functionality in addition to server operations. In exemplary embodiments, the central server system 102 operates within a client-server architecture, executing programs to serve the requests of other programs (i.e., the clients). In this example, the programming receiver 108 acts as the client, and the central server system 102 performs some tasks on behalf of programming receiver 108, to include using the source code to provide machine-readable execution instructions (e.g., machine code) and executing requested functions.

The central server system 102 is communicatively coupled to a build machine 104, and the combination may be referred to as a "central system" or "central server system". Central server systems 102 tend to be very few in number but are also highly complex. In the present context they convert the source code into system program download files, distribute these system program download files to remote systems, retrieve log files, mine log files for desirable and undesirable operational patterns, or the like. One or a few central systems (e.g., a combination of a central server system 102 and a build machine 104) perform automated procedures on the source code, e.g. "compiling" multiple source codes into machine code files and "linking" these into a single, secure, safely transmittable system program download file which can be broadly transmitted to a multiplicity of remote systems, such as programming receivers.

Compilation is the process of reading source code, analyzing it, and generating machine code which executes in the exact manner described by the source code. Machine code is the binary instructions which a processing element in the remote system executes in order to perform its functions. Build time refers to the activity on a central server system 102 to convert source code into machine code, and then package machine code into a system program download file. System program download files include multiple machine code programs compiled and bound into a secure single image which can be transmitted to a remote system; the remote system is then able to upgrade itself from any pre-existing system program by loading and saving the new system program.

The central server system 102 operates cooperatively with the build machine 104 to pre-process a set of source code stored at the central server system 102. Pre-processing takes place during build time, and occurs prior to compiling each set of source code. Here, the build machine 104 evaluates the source code as it goes into the compiler part of the build machine 104. In exemplary embodiments, executable instructions for pre-processing are integrated into a compiler cache part of the build machine 104. However, in other embodiments, pre-processing instructions may be executed from other locations at the central server system 102, the build machine 104, or a combination of both.

Prior to compiling, pre-processing alters the source in such a way that the object code is smaller, by substituting hash values and index values for specific terms/arguments/parameters. Pre-processing also creates one or more dictionary reference files for use by the central server system 102 to interpret received logging data that has been generated using the hash values and index values. The programming receiver 108 operates cooperatively with the central server system 102 to execute log statements, using the condensed source code. During execution of the log statements, the programming receiver 108 also compresses specific terms/arguments/parameters defined at run time, and produces a condensed log file comprising the hash values, the index values, and the compressed values. The use of hash values, index values, and compressed values enables the programming receiver 108 to use fewer resources to generate a smaller log file for transmission to the central server system 102.

Figure 2:
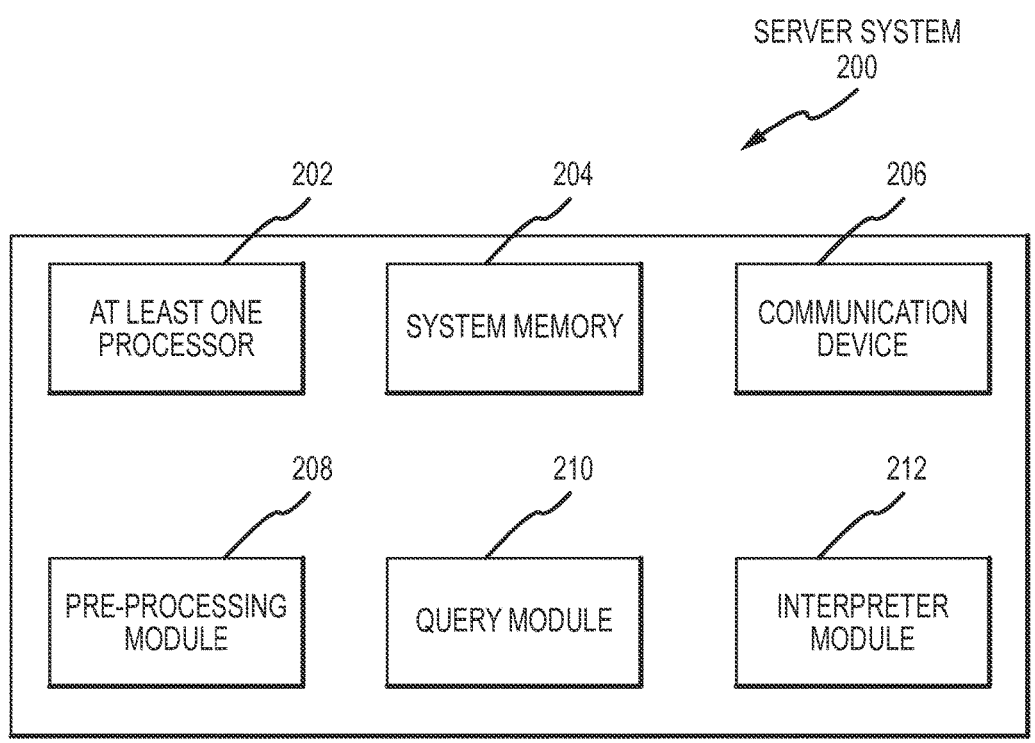
FIG. 2 is a schematic block diagram of a server system, in accordance with the disclosed embodiments.

FIG. 2 is a schematic block diagram of a server system 200, which is suitable for use in the logging data collection system 100 shown in FIG. 1. For purposes of the present disclosure, functionality associated with a build machine operating cooperatively with the server system 200 is included in the description of FIG. 2. The term "server system" is used for simplicity; structure and functionality described herein may be associated with the server system 200, the build machine, and/or varying combinations of both.

The server system 200 generally includes, without limitation: at least one processor 202; system memory 204; a communication device 206; a pre-processing module 208; a query module 210; and an interpreter module 212. These elements and features of the server system 200 may be operatively associated with one another, coupled to one another, or otherwise configured to cooperate with one another as needed to support the desired functionality—in particular, assisting with creating condensed log files for transmission and evaluation, as described herein. For ease of illustration and clarity, the various physical, electrical, and logical couplings and interconnections for these elements and features are not depicted in FIG. 2. Moreover, it should be appreciated that embodiments of the server system 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be used to store various sets of source code (each set coordinating with a particular programming receiver and/or a particular version of programming receiver firmware), one or more reference files or dictionary files for interpreting received logging data (e.g., received log files), encryption and/or compression algorithms used to interpret data transmitted by a programming receiver, or any other data applicable to operations of the server system 200.

The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The communication device 206 is suitably configured to receive and perform processing on signals received by the server system 200 and to transmit signals from the server system 200. The communication device 206 is used to communicate data between the server system 200 and one or more programming receivers (see, for example, FIGS. 1 and 3). As described in more detail below, data received by the communication device 206 may include, without limitation: arguments, parameters, and other information from a programming receiver required to execute instructions associated with the source code stored at the server system 200; logging data files; identifying information associated with a particular programming receiver and/or firmware version; and the like. Data provided by the communication device 206 may include, without limitation: arguments, parameters, function calls, and other information associated with the source code stored at the server system 200; queries for programming receiver logging data; requests for programming receiver identifying information; and the like. The communication device 206 may leverage conventional design concepts that need not be described in detail here.

The pre-processing module 208 is suitably configured to alter a set of source code, stored at the server system 200, which will be used at build time to construct machine code accessed by a programming receiver (such as that depicted in FIGS. 1 and 3) during execution of a log statement. The pre-processing module 208 alters the set of source code to condense portions of the data, in an effort to reduce the amount of logging data transmitted from the programming receiver to the server system 200, and to reduce the resources used by the programming receiver during execution of function calls. Additionally, the pre-processing module 208 may create one or more reference files to facilitate future interpretation of the condensed data.

The query module 210 is configured to generate queries for transmission to a programming receiver. Each query is a request for logging data for a specified period of time, which is collected and maintained for the programming receiver at the programming receiver. The query module 210 may generate queries at timed intervals or in response to the occurrence of an event at the server system 200 or at the programming receiver. The query module 210 operates cooperatively with the communication device 206 to transmit queries to the programming receiver.

The interpreter module 212 is suitably configured to decipher logging data received at the communication device 206. To interpret the received logging data, the interpreter module 212 may use reference files or "dictionary" files created by the pre-processing module 208, which includes relationships between condensed logging data values and condensed versions of that data that have been substituted into the source code during pre-processing. The interpreter module 212 may also use known encryption techniques, which are used by the programming receiver to encode data defined at run time, to interpret received logging data.

In practice, the pre-processing module 208, the query module 210, and/or the interpreter module 212, may be implemented with (or cooperate with) the at least one processor 202 to perform at least some of the functions and operations described in more detail herein. In this regard, the pre-processing module 208, the query module 210, and/or the interpreter module 212, may be realized as suitably written processing logic, application program code, or the like.

Figure 3:
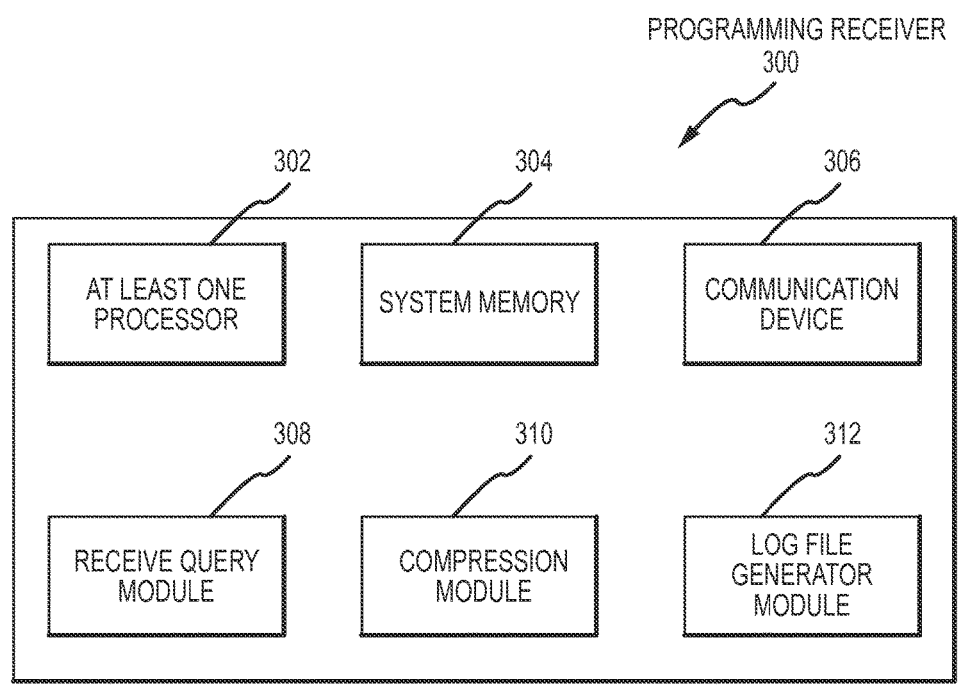
FIG. 3 is a schematic block diagram of a programming receiver, in accordance with the disclosed embodiments.

FIG. 3 is a schematic block diagram of a programming receiver 300, which is suitable for use in the system shown in FIG. 1. In this regard, the programming receiver 300 shows certain elements and components of the programming receiver 108 in more detail. The illustrated embodiment of the programming receiver 300 generally includes, without limitation: at least one processor 302; system memory 304; a communication device 306; a receive-query module 308; a compression module 310; and a log file generator module 312.

The at least one processor 302, the system memory 304, and the communication device 306 are similar in configuration and function to their counterpart items described above in the context of the server system 200. Accordingly, common features and operations of these elements of the programming receiver 300 will not be redundantly described here. However, in some embodiments, the type of information and the format of the data provided by the communication device 306 and/or stored in system memory 304 are different than that associated with the server system 200. For example, the output of the programming receiver 300 may include a logging data file (i.e., a "log file"), applicable encryption and/or compression algorithm data, programming receiver build version, programming receiver firmware version, or the like. As another example, system memory 304 may be configured to store data including one or more sets of executable instructions referred to as "object" code. In the context of the present disclosure, the source code (stored at the server system described above with regard to FIG. 2) is altered and converted at build time into a secondary set of machine executable instructions, and in the context of the present disclosure, may also be referred to as "object code". The programming receiver 300 executes the object code, which includes at least one log statement.

The receive-query module 308 is suitably configured to receive requests for logging data collected, aggregated, and maintained by the programming receiver 300, and initiates a response. Generally, the response includes execution of a log statement (via the log file generator module 312). For example, the receive-query module 308 may receive a query for logging data in response to occurrence of an event (occurring at the server system or at the programming receiver 300), and communicate instructions to execute the log statement. As another example, the receive-query module 308 may receive a query for logging data at timed intervals, and for each query, communicate instructions to execute the log statement.

The compression module 310 is configured to encrypt and/or compress data defined at run time, or in other words, defined during execution of a log statement. The compression module 310 may use any encryption and/or compression technique, including but not limited to: Huffman encoding, converting a numerical base of the data defined at run time, or the like.

The log file generator module 312 is configured to aggregate logging data for a specified period of time into a log file for transmission to a remote server. To accomplish this, the log file generator module 312 from time to time executes log statements in a set of executable instructions (the object code) stored in system memory 304. The log file generator module 312 creates a log file that contains numeric index, hash code, and argument values in place of (usually much bulkier) text strings. Thus, the log file is smaller in size than a log file generated by object code produced by building with unaltered source.

Figure 4:
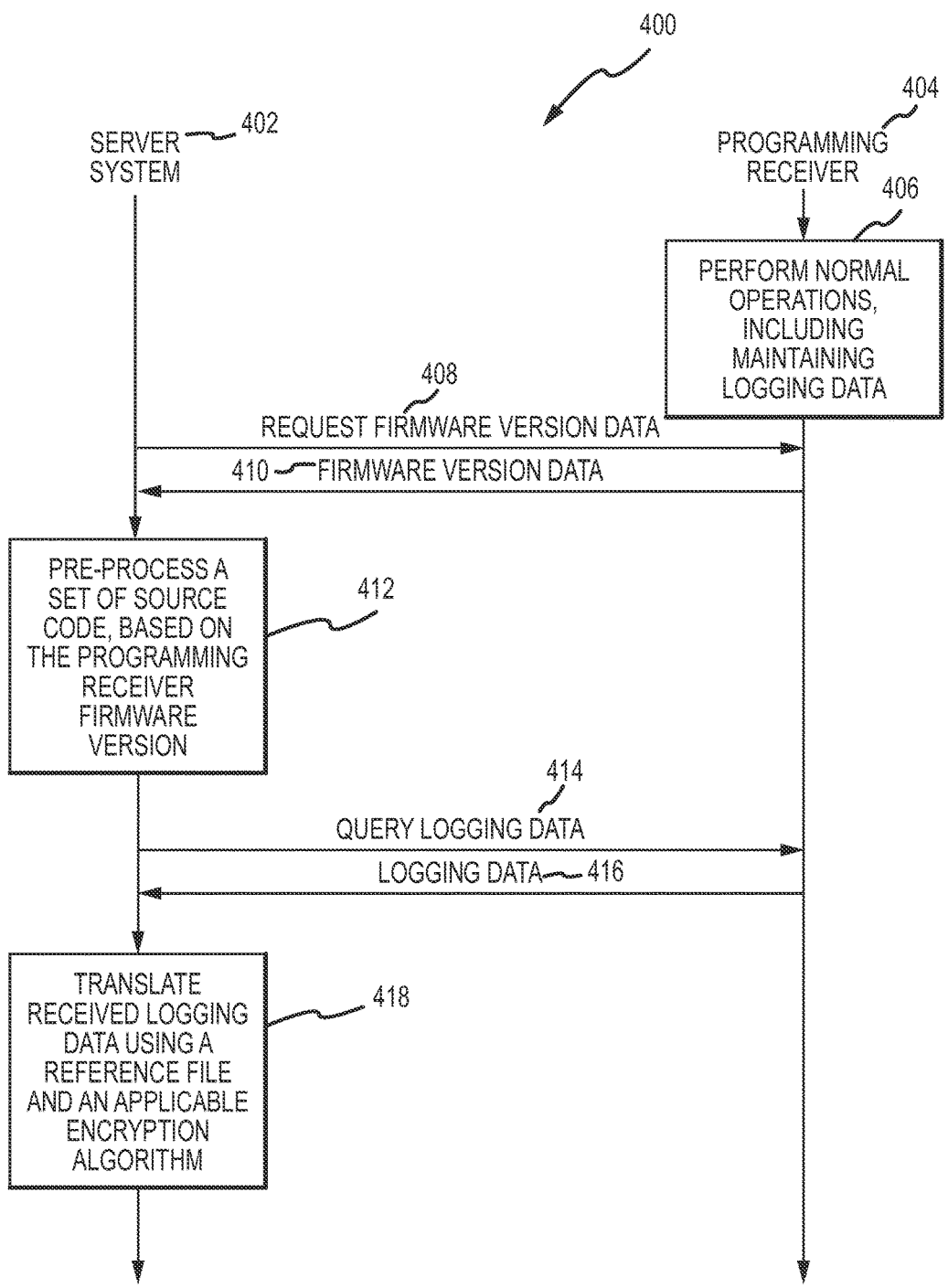
FIG. 4 is a combination of a timing diagram and a flow chart that illustrates an embodiment of a process for operation of a logging data collection system.

FIG. 4 is a combination of a timing diagram and a flow chart that illustrates an embodiment of a process 400 for operation of a logging data collection system. This example illustrates the communications and steps in the process 400 that are performed by a server system 402 and a programming receiver 404, and how they relate to each other to complete the process 400. Here, the tops of the arrows associated with the server system 402 and the programming receiver 404 indicate the beginning of the process 400.

For ease of description and clarity, it is assumed that the programming receiver 404 begins by performing normal operations, including maintaining logging data (step 406), prior to receiving requests or queries from the server system. One suitable methodology for maintaining logging data is described below with reference to FIG. 6. Normal operations for the programming receiver include, without limitation, receiving audio/video content from a content source, presenting the audio/video content according to user selection, recording and replay of audio/video content, and other operations (as described above with regard to FIG. 1). Generating and maintaining logging data are parallel functions that are performed alongside the "normal" operations of the programming receiver. In other words, logging data is created and collected simultaneously with the performance of the normal operations. Logging data is a collection of data indicating operational events including errors and/or failure conditions occurring at the programming receiver during normal operations. A log file is a periodically produced aggregation of logging data, which is transmitted to a remote server for further analysis and/or processing.

In certain embodiments, the server system 402 begins by transmitting a request 408 to the programming receiver 404. For this example, request 408 serves as a request for firmware version data of the programming receiver. A specific set of source code (which resides at the server) is associated with each firmware version for a programming receiver. Accordingly, the server system requires knowledge of the firmware version of the programming receiver. This example assumes that the request 408 is successfully received and processed by the programming receiver 404. Accordingly, the programming receiver 404 continues by transmitting the requested firmware version data 410 to the server system 402. In other embodiments, however, the firmware version data is transmitted to the server system 402 as part of the logging data 416, and a distinct request 408 and transmission 410 are not required.

This example assumes that the server system 402 receives the firmware version data 410 for the programming receiver 404. Here, the server system 402 identifies the firmware version (based on the received firmware version data 410) for the programming receiver 404 currently communicating with the server system 402, and determines which set of source code is applicable to the identified firmware version. The version of the firmware indicates the applicable version of source code that the programming receiver requires for execution of object code. From the perspective of the programming receiver, once the firmware version is provided, the applicable source code is available for use.

Following transmission of the requested firmware version data 410, the programming receiver 404 continues normal operations until further communications are received from the server system 402. In certain embodiments, once the programming receiver firmware version data 410 has been received by the server system 402, the server system 402 pre-processes the set of source code indicated by the programming receiver firmware version (step 412). In exemplary embodiments, however, the pre-processing step (step 412) occurs at build time (as described above with respect to FIG. 1). In the case of pre-processing occurring at build-time, the firmware version may be known to the server system 402, and the pre-processing step (step 412) may be executed once, while receiving logging data numerous times for a plurality of programming receivers. One suitable methodology for pre-processing the set of source code is described below with reference to FIG. 5. Pre-processing involves preparing the source code for use by the object, by condensing parts of the source code that will be used to generate a log file. Pre-processing may also include creating one or more "dictionary" files for later interpretation of the condensed data in the log file.

After pre-processing the set of source code (step 412), the server system 402 generates a query 414 for programming receiver logging data, and transmits the query 414 to the programming receiver 404. Logging data may be aggregated and transmitted as a "log file". Generally, logging data is transmitted to the server system 402 in response to a request. In certain embodiments, queries 414 for logging data are generated at timed intervals, and logging data is received by the server system 402 according to this schedule. For example, a query 414 for logging data may be generated every twenty-four hours, every seven days, every month, or according to any other applicable timed interval. In some embodiments, a query 414 is generated upon the occurrence of a particular event at the server system 402 or at the programming receiver 404. For example, the server system 402 may generate a query 414 each time a particular section of the source code and/or object code is executed, when an error has been detected, when a particular selection is made at the programming receiver 404, or the like.

This example assumes that the query 414 is successfully received and interpreted by the programming receiver 404. Consequently, the programming receiver 404 continues by transmitting the requested logging data 416. In certain embodiments, the logging data may be aggregated and saved until requested, and then transmitted as a log file to the server system 402 in response to the query 414. In some embodiments, however, a log statement is executed (thereby producing the logging data 416) upon receipt of the query 414. In this manner, the logging data 416 may be produced only upon request, and storage of logging data may not be required. In this case, the need to store logging data may not exist if the programming receiver 404 is able to send each logging statement directly to the server system 402 by spontaneously sending logging data 416 as part of each log statement.

Once the logging data 416 has been received, the server system 402 translates the received logging data 416 using a reference file and an applicable encryption algorithm (step 418). One suitable methodology for translating (i.e., interpreting) a log file generated using a set of source code is described below with reference to FIG. 7. The received logging data 416 is produced when the programming receiver 404 executes a log statement, which uses condensed forms of the source code and the object code to generate a condensed version of the logging data 416. A reference file may also be referred to as a "dictionary" file, which includes the condensed portions of the source code and the associated, original portions of the source code. Thus, when condensed logging data 416 has been received, the server system 402 may use the reference file to identify and translate part of the "un-condensed" (i.e., full-version) content contained in the condensed logging data 416. The applicable encryption algorithm is the same encryption algorithm that is used by the programming receiver 404 to condense portions of the object code during execution of a log statement. Here, the server system 402 may use knowledge of this encryption algorithm to further identify and translate the remaining part of the "un-condensed", full version content contained in the condensed logging data 416.

Figure 5:
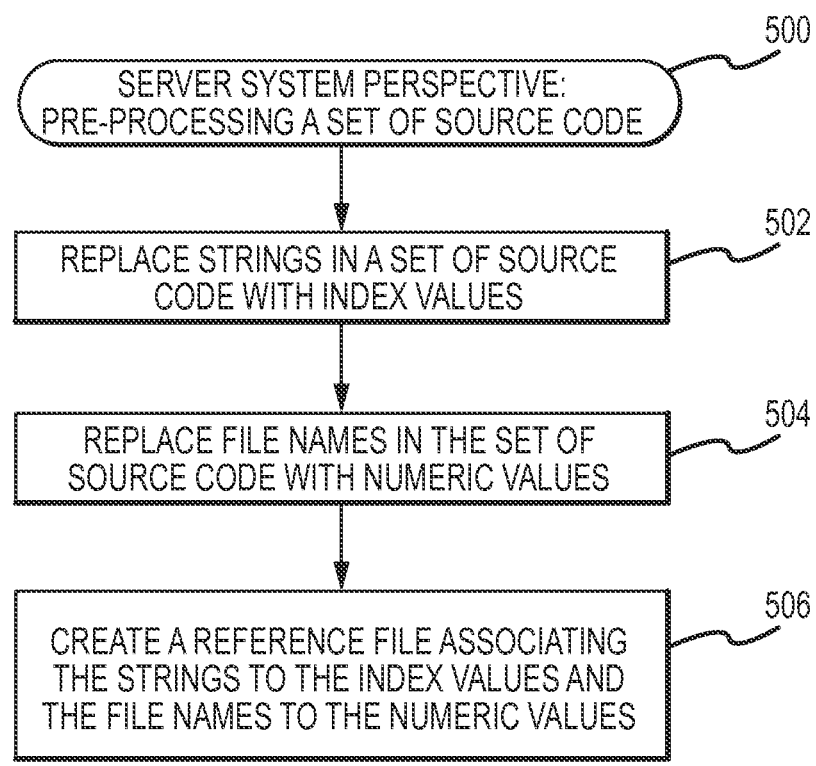
FIG. 5 is a flow chart that illustrates an embodiment of a process for pre-processing a set of source code.

FIG. 5 is a flow chart that illustrates an embodiment of a process 500 for pre-processing a set of source code. It should be appreciated that the process 500 described in FIG. 5 represents one embodiment of step 412 described above in the discussion of FIG. 4, including additional detail. First, the process 500 detects strings in a set of source code and replaces the strings with index values (step 502). A string is literal text consisting of 8- or 16-bit encodings of human readable characters. In the present context, this primarily concerns the names of software modules, such as source code files, and human-readable character sequences such as logging format strings and any other human readable message string which is essential to the intended operation of the remote system (e.g., programming receiver) and to the generation of its log files. The strings in the source code are replaced in an effort to provide condensed data to object code accessing (i.e., invoking) the source code. The index values are arbitrary numeric values used to replace the strings in the source code during pre-processing. The numeric values are "arbitrary" because any numeric value may be used.

Next, the process 500 detects file names in the set of source code and replaces the file names with numeric values (step 504). Similarly to the index values described with respect to step 502, these numeric values are arbitrary with respect to the strings themselves. Using numeric values that do not use a particular pattern or well-known encryption scheme transforms the logging file data (produced using the source code) so that is not human-readable. In this way, the file names and strings (and thus, the source code executable) are effectively encoded. In certain embodiments, the process 500 uses a hash value as a numeric value. A file name hash is the numeric result of a mathematical operation which reduces a potentially very lengthy string representing the name of a unique software source file to a single conveniently sized numeric value which is also unique. In other embodiments, the process 500 uses another technique to produce the numeric values.

After (or while) replacing the strings with index values (step 502) and the file names with numeric values (step 504), the process 500 creates a reference file (i.e., a dictionary file) in which each string is found at its index value and each file name is associated with its numeric hash value (step 506). The process 500 stores each of the replaced strings and file names in the dictionary file. Here, the dictionary file is essentially a set of strings, where a string is text consisting of 8- or 16-bit encodings of human readable characters, and an index value is the numeric address of a particular string in a dictionary file. Each string added to the file may be placed such that its index is the numeric value assigned to a location in the dictionary file, and are thereafter used to indicate the data storage location (and thus, the string data and/or file name data stored at the data storage location). A separate section of the dictionary file, or perhaps a separate file may convert the numeric file hash value to a dictionary string index.

Figure 6:
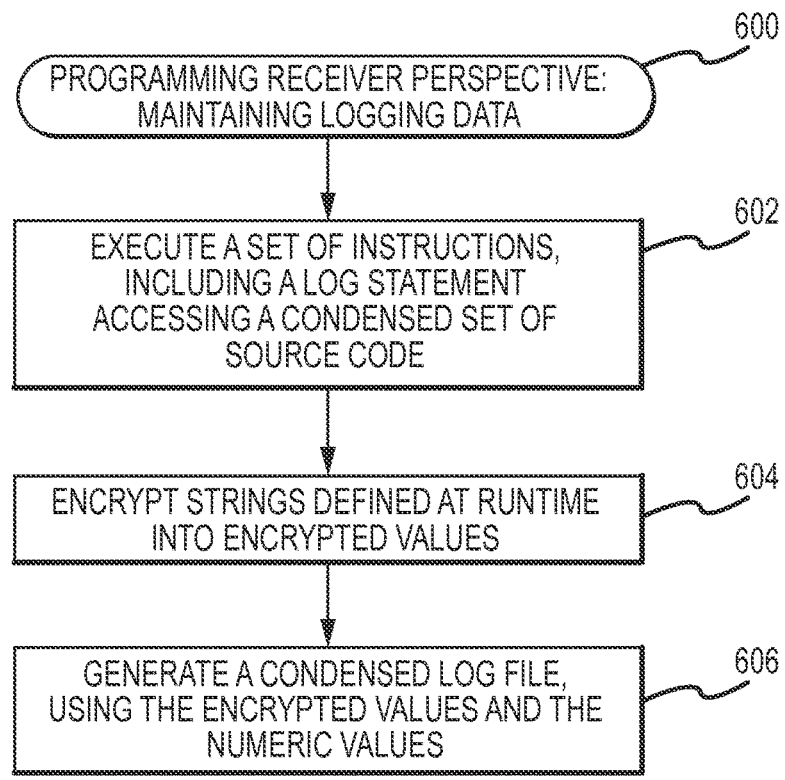
FIG. 6 is a flow chart that illustrates an embodiment of a process for creating and maintaining programming receiver logging data.

FIG. 6 is a flow chart that illustrates an embodiment of a process for creating and maintaining programming receiver logging data. It should be appreciated that the process 600 described in FIG. 6 represents one embodiment of step 406 described above in the discussion of FIG. 4, including additional detail. First, the process 600 executes a set of instructions, including a log statement configured to access a condensed set of source code (step 602). The set of instructions may be referred to as "object" code, and includes standard operations for the programming receiver. Log statements are executed by the programming receiver at the same time that the programming receiver is carrying out standard operations. Log statements are included in the object code and, during execution, regularly access variables, functions, and other data included in a set of source code. Here, the condensed set of source code has been pre-processed to reduce the size of the source code and portions of the source code that will be passed to the object code during execution. Because the set of source code has been pre-processed, the strings and file names in the source code have been replaced with numeric values. These numeric values are provided to the log statements when accessing and executing (i.e., invoking) portions of the source code, thereby producing results using numeric values in place of strings and/or file names. Thus, the size of the generated logging data is reduced and the logging file data is made to look arbitrary and human unreadable.

In the context of the present disclosure, the source code (stored at the server system described above with regard to FIG. 2) is altered and converted at build time into a secondary set of machine executable instructions, and in the context of the present disclosure, may also be referred to as "object code". The programming receiver 300 executes the object code, which includes at least one log statement. Here, the process 600 receives data from the set of condensed source code, to include variable data, constant data, function data, data incorporated into the source code via header files and libraries, and the like. Received data includes at least one index value, hash value, and/or other numeric value that has been inserted into the source code to replace a string value or file name, and the process 600 uses the at least one index value or hash value as a parameter during execution of the log statement.

During execution of the set of instructions (step 602), the process 600 encrypts strings defined at run time into encrypted values (step 604). Run time is the time at which machine code operates on a remote system. The process 600 is dependent upon compression of string values used during execution of the object code, to produce "condensed" logging data (i.e., logging data that has been reduced in size). The pre-processed source code has eliminated all of the strings which are processed by the object code, by replacing them with index values which are much smaller. Other string values are produced and/or defined at the programming receiver during execution of the object code. These strings are encrypted, compressed, or otherwise encoded at run time, since they are unavailable during pre-processing. Encryption of the strings accomplishes security purposes (e.g., to prevent the non-literal strings from being human-readable) and shrinks the amount of logging data for transmission.

Here, during execution of the set of instructions, the process 600 defines a variable value comprising a string for insertion into the log statement, wherein strings defined at run time comprise the variable value. The process 600 then encrypts the variable value to generate a result, and inserts the encrypted result into an appropriate position in the log statement. In one particular example, a print format string in the object code includes variable values defined at run time in the form of zero or more format specifiers, in addition to other text. A format specifier includes a percent sign plus one or more assisting characters (e.g., "% d", "% s"), as is common in the art, and acts as a variable to be defined at run time. At run time, the process 600 defines a print argument for each format specifier, and encrypts those print arguments that are strings. (Here, a print argument is any value, either a number or a string, required to satisfy a format specifier.) Although the process 600 may use any encryption and/or compression techniques, exemplary embodiments include Huffman encoding, number-base changes, or the like.

After executing the log statement (step 602) and encrypting the strings (step 604), the process 600 generates a condensed log file, using the encrypted values and the index values (step 606). Here, execution of the log statement generates the logging data included in the log file. The log file is "condensed" because it does not include string values. Strings and file names from the source code were replaced with numeric values during pre-processing, which occurs prior to execution of the log statement. Strings defined at run time were compressed and/or encrypted during execution of the log statement. All string values used during execution of the log statement have been reduced in size, and the results generated by the log statement function are size-reduced in the same way. Thus, the size of the generated log file is significantly smaller than it would have been if the string values had not been condensed, and the data is effectively made to look arbitrary and human unreadable.

Figure 7:
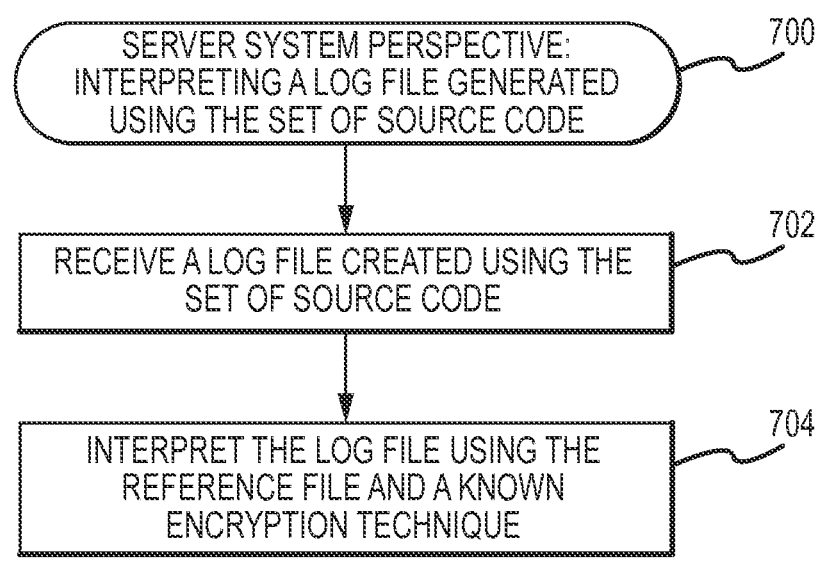
FIG. 7 is a flow chart that illustrates an embodiment of a process for interpreting a log file generated using a set of source code.

FIG. 7 is a flow chart that illustrates an embodiment of a process 700 for interpreting a log file generated using a set of source code. It should be appreciated that the process 700 described in FIG. 7 represents one embodiment of step 418 described above in the discussion of FIG. 4, including additional detail.

First, the server system receives a log file created using a set of source code (step 702). The log file is generally sent from a programming receiver, and includes details associated with operation of the sending programming receiver. A log file is a periodically produced aggregation of logging data, which is transmitted from a programming receiver to the server system for further analysis and/or processing. Logging data is information collected by the programming receiver indicating errors and/or failure conditions occurring at the programming receiver during normal operations.

The process 700 interprets the received log file using the reference file and a known encryption technique (step 704). The log file includes three forms of encoded data: (1) string data that has been replaced with index values and (2) file name data that has been replaced with numeric values, as described above with respect to FIG. 5; and (3) string data that has been encrypted by the sending programming receiver. The process 700 uses the reference file to determine the content of the string data that was replaced with index values and other numeric values. The process 700 also determines the encryption scheme used by the programming receiver to compress the data, and then uses the known encryption scheme to determine the content of the string data that was encrypted and/or compressed.

The various tasks performed in connection with processes 400-700 may be performed by software, hardware, firmware, or any combination thereof. For illustrative purposes, the preceding descriptions of processes 400-700 may refer to elements mentioned above in connection with FIGS. 1-3. In practice, portions of processes 400-700 may be performed by different elements of the described system. It should be appreciated that processes 400-700 may include any number of additional or alternative tasks, the tasks shown in FIGS.

4-7 need not be performed in the illustrated order, and processes 400-700 may be incorporated into a more comprehensive procedure or process having additional functionality not described in detail herein. Moreover, one or more of the tasks shown in FIGS. 4-7 could be omitted from an embodiment of the processes 400-700 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for producing log data for a programming receiver, the method comprising:
   during run time of an object of a condensed set of source code by the programming receiver,
      executing a set of instructions comprising at least a log statement by the programming receiver, the log statement causing the programming receiver to access condensed source code;
      compressing one or more string arguments in the log statement, during execution of the set of instructions by the programming receiver, to produce compressed values, wherein the set of instructions comprising at least the log statement is executed using index values and the compressed values;
      generating a log file by the programming receiver, based on the executed set of instructions and the compressed one or more string arguments;
      receiving data from the condensed set of source code by the programming receiver, the data comprising the index values; and
      using the index values as parameters during execution of the log statement by the programming receiver;
   wherein the generated log file comprises the data; and
   wherein the index values comprise numeric values associated with the strings.

2. The method of claim 1, further comprising:
   receiving a query; and in response to the query, performing steps of executing the set of instructions, compressing the one or more string arguments, and generating the log file.

3. The method of claim 1, wherein the method further comprises:
performing steps of executing the set of instructions, compressing the one or more string arguments, and generating the log file according to a timed interval schedule.

4. The method of claim 1, further comprising:
receiving data, by the programming receiver, the data received from the condensed source code during execution of the set of instructions, the data comprising at least one indexed literal string, wherein the index values comprise the at least one indexed string; and
using the at least one indexed literal string as a parameter during execution of the log statement by the programming receiver;
wherein the generated log file comprises the data; and
wherein the at least one indexed string comprises at least one numeric value.

5. The method of claim 1, wherein the compressing step further comprises:
during execution of the set of instructions by the programming receiver,
defining a variable value comprising a string for insertion into the log statement by the programming receiver, the one or more string arguments comprising the variable value;
encrypting the variable value, by the programming receiver, to generate a result; and
inserting the result into the log statement, by the programming receiver, during execution of the set of instructions;
wherein the generated log file comprises the result.

6. The method of claim 1, wherein the compressing step further comprises encoding the one or more string arguments by the programming receiver.

7. The method of claim 1, wherein the compressing step further comprises encoding the one or more string arguments by converting a numerical base of the one or more string arguments, by the programming receiver.

8. The method of claim 1, wherein the one or more string arguments comprises one or more strings.

9. A programming receiver, comprising:
system memory;
a communication device, configured to transmit a log file; and
at least one processor, communicatively coupled to the system memory and the communication device, the at least one processor configured to:
during run time of an object of a condensed set of source code by the programming receiver,
compress arguments defined at run time to produce compressed values by the programming receiver;
execute a log statement using index values and the compressed values, by the programming receiver, the log statement invoking the condensed set of source code during execution;
generate the log file based on data produced during execution of the log statement by the programming receiver;
receive data from the condensed set of source code by the programming receiver, the data comprising the index values; and
use the index values as parameters during execution of the log statement by the programming receiver;

wherein the generated log file comprises the data; and
wherein the index values comprise numeric values associated with the strings.

10. The programming receiver of claim 9, wherein the programming receiver is further configured to transmit the log file to a central server system; and
wherein the central server system and the programming receiver are disparately located.

11. The programming receiver of claim 9, wherein the communication device is further configured to:
receive a query; and
transmit the log file in response to the query.

12. The programming receiver of claim 9, wherein the at least one processor is further configured to compress the set of strings and execute the log statement according to a timed interval schedule.

13. The programming receiver of claim 9, wherein the programming receiver is further configured to:
define a variable value comprising a string for insertion into the log statement, the second set of strings defined at run time comprising the variable value;
encrypt the variable value to generate a result; and
insert the result into the log statement, prior to execution of the log statement;
wherein the generated log file comprises the result.

14. The programming receiver of claim 9, wherein the encryption technique comprises Huffman encoding.

15. The programming receiver of claim 9, wherein the encryption technique comprises encoding the set of strings by converting a numerical base of the set of strings.

16. A method for generating a log file for a programming receiver, the method comprising:
during run time of an object of a condensed set of source code by the programming receiver,
compressing arguments defined at run time to produce compressed values by the programming receiver;
executing a log statement using index values and the compressed values, by the programming receiver, the log statement invoking the condensed set of source code during execution;
generating the log file based on data produced during execution of the log statement by the programming receiver; and
during run time of the object of the condensed set of source code by the programming receiver,
receiving data from the condensed set of source code by the programming receiver, the data comprising the index values; and
using the index values as parameters during execution of the log statement by the programming receiver;
wherein the generated log file comprises the data; and
wherein the index values comprise numeric values associated with the strings.

17. The method of claim 16, further comprising:
receiving a query; and
in response to the query, compressing the arguments, executing the log statement, and generating the log file.

18. The method of claim 16, further comprising:
performing steps of compressing the arguments, executing the log statement, and generating the log file according to a timed interval schedule.

19. The method of claim 16, wherein, prior to run time of the object of the condensed set of source code, the method further comprises:
transmitting a firmware version associated with the object of the source code, by the programming receiver; and receiving, by the programming receiver, the object based on the firmware version.

\* \* \* \* \*